H. L. & E. J. ZAHM.
Watch Regulator.
No 69,381.
Patented Oct. 1, 1867.
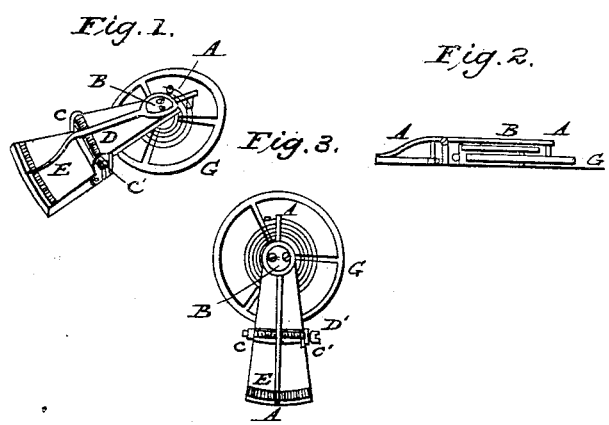

United States Patent Office.

HENRY L. ZAHM AND EDWARD J. ZAHM, OF LANCASTER, PENNSYLVANIA.

Letters Patent No. 69,381, dated October 1, 1867.

IMPROVEMENT IN WATCH-REGULATORS.

The Schedule referred to in these Letters Patent and making part of the same.

TO ALL WHOM IT MAY CONCERN:

Be it known that we, HENRY L. ZAHM and EDWARD J. ZAHM, known as the firm of H. L. & E. J. ZAHM, in the city of Lancaster, and State of Pennsylvania, have invented a new and useful Improvement on Regulators for Watches; and we do hereby declare that the following is a full, clear, and exact description of the construction and operation of the same, reference being had to the accompanying drawings, making a part of this specification, in which—

Figure 1 is a perspective view of the several parts,

Figure 2 a side elevation, and

Figure 3 a vertical view of the same.

Our invention consists in providing the regulator with an angular base, which shall rest on an operating-screw, whereby the regulator can be minutely adjusted, as will be hereinafter more fully described.

To enable others skilled in the art to make and use our invention, we will proceed to describe its construction and operation, clearly indicated by the drawing. The plate or bracket that extends over the balance-wheel supports the regulator A with its collet B. This regulator has an angular base fitting into the thread cut upon the transverse screw D, in which it rests, the arm being extended forwards, and curved down, as shown, to come in close contact with the anterior sunken top face of the bracket, where there is a graduated scale to indicate the position of the point of the regulator. The transverse regulating-screw D has bearings C C', and is confined to its position, but moves freely with the aid of a small screw-driver; otherwise the end of the regulator acts upon the curb and spiral spring or balance in the ordinary manner. The application of a screw is to the regulator what the vernier is to the theodolite, since the screw can be turned with as much delicacy as it is possible to move the regulator itself by the most careful touch; and yet, if the screw is moved an entire revolution, the indicator or regulator moves but the one hundredth part of an inch; it follows that turning the screw but one degree of the circle, the motion on the regulator would be but the three hundred and sixtieth part of such one hundredth of an inch. Thus watches can be regulated in the most perfect manner; besides, when once accurately adjusted, the regulator is so firmly held in the thread of the said screw that no jar or concussion can displace it; nothing short of external force applied directly to the regulator can change its position. These several and important considerations make this a valuable improvement to the present advanced state of mechanical perfection.

We are aware that screws have been employed to operate the curb of the spiral spring; we therefore do not claim the same, but we do claim—

The regulator A, having an angular base, resting on the operating-screw D, substantially as described.

H. L. ZAHM,
EDW. J. ZAHM.

Witnesses:
JAS. B. KREMER,
AL. M. ZAHM.